(12) United States Patent
Curliss et al.

(10) Patent No.: US 7,338,684 B1
(45) Date of Patent: Mar. 4, 2008

(54) VAPOR GROWN CARBON FIBER REINFORCED COMPOSITE MATERIALS AND METHODS OF MAKING AND USING SAME

(75) Inventors: David B. Curliss, Beavercreek, OH (US); Jason E. Lincoln, Englewood, OH (US)

(73) Assignee: Performance Polymer Solutions, Inc., Centerville, OH (US)

( * ) Notice: Subject to any disclaimer, the term of this patent is extended or adjusted under 35 U.S.C. 154(b) by 11 days.

(21) Appl. No.: 11/057,462

(22) Filed: Feb. 14, 2005

Related U.S. Application Data

(60) Provisional application No. 60/544,178, filed on Feb. 12, 2004.

(51) Int. Cl.
*B05D 1/12* (2006.01)

(52) U.S. Cl. .................. 427/180; 427/203; 427/206; 427/249.2; 427/249.4; 977/843; 423/447.3

(58) Field of Classification Search ............. 427/180, 427/203, 206, 243, 249.2, 249.3, 249.4, 301; 427/903; 977/843, 890; 423/447.1, 447.3, 423/445 B
See application file for complete search history.

(56) References Cited

U.S. PATENT DOCUMENTS

| | | | |
|---|---|---|---|
| 4,349,462 A * | 9/1982 | Velenyi et al. ............ 502/64 |
| 5,024,818 A | 6/1991 | Tibbetts et al. | |
| 5,165,909 A | 11/1992 | Tennent et al. | |
| 5,374,415 A | 12/1994 | Alig et al. | |
| 5,597,611 A * | 1/1997 | Lennox et al. ............ 427/113 |
| 5,618,875 A * | 4/1997 | Baker et al. ............ 524/495 |
| 6,235,674 B1 * | 5/2001 | Tennent et al. ............ 502/174 |
| 6,236,674 B1 | 5/2001 | Tennent et al. | |
| 6,346,189 B1 * | 2/2002 | Dai et al. ............ 205/766 |
| 6,401,526 B1 * | 6/2002 | Dai et al. ............ 73/105 |
| 6,495,258 B1 * | 12/2002 | Chen et al. ............ 428/408 |
| 2003/0099592 A1 * | 5/2003 | Rodriguez et al. ........ 423/445 R |

FOREIGN PATENT DOCUMENTS

| | | |
|---|---|---|
| EP | 0 222 492 A2 * | 5/1987 |
| WO | WO 03/097909 A2 * | 11/2003 |

OTHER PUBLICATIONS

Yacaman et al., "Catalytic growth of carbon microtubles with fullerene structure", Appl. Phys. Lett., 62, 6, 1993, pp. 657-659.*
Ivanov et al., "Catalytic production and purification of nanotubles having fullerene-scale diameters", Carbon, 33, 12, 1995, pp. 1727-1738.*
Thostenson et al., "Carbon nanotube/carbon fiber hybrid multiscale composites", Journal of Applied Physics, 91, 9, May 2002, pp. 6034-6037.*
Hernadi, et al., Carbon, 34(10), 1249,1996.
Ivanov, et al., Carbon, 33(12), 1727, 1995.
Thostenson, E. T., et al., Journal of Applied Physics, 91(9), 6034, 2002.
Li, W. Z., et al., Chem. Phys. Letters, 335, 141, 2002.
Yacaman, M. J. et al., Applied Physics Letters, 62, 657, 1993.
Tandon, G.P., et al., Proceedings of 17th ASC Technical Conference, Purdue University, West Lafayette, IN, Oct. 21-23, 2002.
Rice, B.P., et al., Proceedings of the 2004 International SAMPE Symposium, Long Beach, CA, May 16-20, 2004.

* cited by examiner

*Primary Examiner*—Bret Chen
(74) *Attorney, Agent, or Firm*—Dorsey & Whitney LLP

(57) ABSTRACT

A process for producing-vapor grown carbon fiber (VGCF) reinforced continuous fiber performs for the manufacture of articles with useful mechanical, electrical, and thermal characteristics is disclosed. Continuous fiber preforms are treated with a catalyst or catalyst precursor and processed to yield VGCF produced in situ resulting in a highly entangled mass of VGCF infused with the continuous fiber preform. The resulting continuous fiber preforms are high in volume fraction of VGCF and exhibit high surface area useful for many applications. Furthermore, this invention provides for a continuous fiber preform infused with VGCF so that the carbon nanofibers are always contained within the fiber preform. This eliminates the processing steps for isolated carbon nanofibers reported in other carbon nanofiber composite approaches and therefore greatly reduces risk of environmental release and exposure to carbon nanofibers.

15 Claims, 3 Drawing Sheets

US 7,338,684 B1

VAPOR GROWN CARBON FIBER REINFORCED COMPOSITE MATERIALS AND METHODS OF MAKING AND USING SAME

CROSS-REFERENCE TO RELATED APPLICATION

This application claims the benefit of U.S. Provisional application 60/544,178, filed Feb. 12, 2004, which is incorporated by reference herein to the extent it is not inconsistent with the present application.

STATEMENT AS TO RIGHTS TO INVENTIONS MADE UNDER FEDERALLY SPONSORED RESEARCH AND DEVELOPMENT

This work was supported in part by a grant from the United States Air Force Office of Scientific Research, STTR Contract # FA9550-04-0129. The Government of the United States of America may have certain rights in this invention.

BACKGROUND OF THE INVENTION

This invention relates to novel continuous fiber composites reinforced with vapor grown carbon fibers (VGCF). In particular, the invention relates to novel non-woven, woven and braided continuous fiber composite preforms that are subsequently reinforced with vapor grown carbon fibers that are grown in situ in the preform and methods of making and using same. The resulting vapor grown continuous fiber reinforced composite preform exhibits increased fiber volume fraction of reinforcing fibers and greatly increased surface area thus improving the strength, stiffness, electrical conductivity, and thermal conductivity of polymer matrix composites produced from these preforms while maintaining the manufacturing benefits of a non-woven, braided or woven preforms. The resulting articles produced from VGCF infused preforms produced in this way are useful for numerous applications that take advantage of the unique structural, morphological, electrical, and thermal properties. Furthermore, this invention provides for a continuous fiber preform infused with VGCF so that the carbon nanofibers are always contained within the fiber preform. This eliminates the processing steps for isolated carbon nanofibers reported in other carbon nanofiber composite approaches and therefore greatly reduces risk of environmental release and exposure to carbon nanofibers.

This invention is useful for applications in numerous industries including composite materials, filtration materials, electrodes, membranes, cell growth supports, catalysis, and many other novel and emerging applications that will benefit from this unique technology.

Polymer matrix composites are well known for use in structural and thermal-structural applications. Continuous yarn, and other multidimensional 2-D and 3-D, non-woven, woven or braided, composite preforms are used in the manufacture of reinforced composites due to their economical manufacturing processes. For the purposes of this invention the term "preform" means a continuous fiber yarn, or broad good produced from the yarn (including non-woven mats, woven or braided constructions) and assemblies of preforms further constructed. Through weaving or braiding of the reinforcing fiber yarns of carbon or graphite (carbon and graphite fibers are generally referred to collectively as "carbon fiber" and the term "carbon fiber" is used throughout to mean "carbon and/or graphite fiber"), glass, or ceramic fiber a composite "preform" can be manufactured into a near net shape that is subsequently infused with a polymer resin and cured in a mold to manufacture articles. Preforms may also be infused with a polymer or polymer resin to manufacture a prepreg useful for the fabrication of composite material articles. Using well-known methods the non-woven, woven or braided preforms are manipulated by slitting, combining together, stitching together, shaping, or other methods to assemble a near net shape preform for the fabrication of a composite article. The continuous fiber preform processes are advantageous since they can be used very economically to produce a variety of shapes useful in the manufacture of composites. A fundamental limitation of certain woven, braided, non-woven mat, or felt preform technology to date, however, has been that the resulting composites manufactured from these preforms are of lower strength and stiffness than composites manufactured using other methods. This is due in part to the lower fiber volume fraction that results from the weaving and braiding processes, and in part to the failure mechanisms woven and braided composites intrinsically related to the reinforcing fiber geometry and architecture.

A goal in composite materials design has been to obtain materials which exhibit high stiffness, strength, fracture toughness, controllable electrical and thermal properties and can be affordably manufactured. Hence, there exists a need for a novel approach to improve the stiffness, strength, fracture toughness, and the electrical and thermal properties, of woven and braided composite materials while maintaining the low cost advantages of woven and braided preform manufacturing.

The present invention is concerned with the use of vapor grown carbon fibers produced in a composite preform to improve the mechanical, electrical, and thermal characteristics of composite materials produced from these preforms. Vapor grown carbon fibers are produced directly from hydrocarbons such as methane, acetylene, ethane, or hydrocarbon gas mixture, in a gas phase reaction upon contact with a catalytic metal particle in a non-oxidizing gas stream. Various reaction processes, conditions, and chambers are known and described in e.g., U.S. Pat. Nos. 5,024,818 and 5,374,415 for the manufacture of VGCF. Vapor grown carbon fibers differ substantially from commercial carbon fiber in that the fibers are not continuous. The vapor grown carbon fibers can vary in diameter and length depending on processing parameters, gas composition, and catalyst particle characteristics but exhibit diameters in the range of 1 to 500 nm and lengths in the range of 0.1 μm to 500 μm.

More importantly and pertinent to this application is that the fiber diameter of a vapor grown carbon fiber is generally under 1 μm. As those familiar with the growth of vapor grown carbon fibers know, these fibers can be subsequently thickened to the diameter of commercial fibers. However, these fibers are not as desirable from an economic or performance perspective. It is desirable to use fibers that are smaller than the diameter of a commercial fiber by a factor in the range of 10 to 100.

Further, as the vapor grown carbon fibers are much finer than continuously produced carbon fibers they can be used effectively to increase the fiber volume fraction of a continuous fiber composite by occupying the void spaces between the continuous fibers. The fine diameter vapor grown carbon fibers can occupy spaces in non-woven, woven or braided composite preforms without perturbing the geometry, orientation, or continuous fiber volume fraction of the preform. The result is that the overall fiber volume fraction is increased leading to desirable changes in the mechanical, electrical, and thermal behavior of composite materials manufactured from these preforms.

A further distictly novel advantage of this approach is that vapor grown carbon nanofibers are intimately and uniformly incorporated into a composite material. The in situ process to produce the nanofiber reinforced preform ensures that nanofibers are well distributed throughout. Carbon nanofibers are typically incorporated into a polymer matrix composite by mixing and/or dispersing the nanofibers into the resin, then used the nanofiber/resin mixture to prepare composites. This method has many disadvantages including cost, additional process operations, nanofiber damage from mixing, negative impact on resin rheology, and the nanofibers must be handled and possible health risks from nanofiber exposure is a concern. The nanofibers are produced directly from catalytic particles formed on the continuous fiber surface, thus the nanofibers are fused to the continuous fiber surface and act to enhance the adhesion of the composite matrix to the continuous fiber, further improving the properties of resulting composite materials.

A further distinctly novel advantage of the present invention is to change the electrical conductivity of a nonconducting composite material preform at very low levels of nanofiber. It is known that carbon nanofibers can be incorporated into a polymer matrix by mixing, blending, solvent-assisted blending, or other similar techniques. At a certain fraction of nanofibers the polymer composites made in this way become conductive due to continuous contact of the inherently conductive nanofibers. The point at which this continuous conduction occurs is commonly referred to as the "percolation threshold." In conventional nanofiber composites where the nanofibers are mixed into the matrix material this typically occurs at weight fractions of nanofiber to polymer of 1% to 30% depending on the nanofiber morphology, mixing techniques, and other variable factors. In the novel approach described in this invention conductivity occurs at nanofiber levels approximately ten times lower. This phenomenon is because the nanofibers are not broken down in aspect ratio and their intimate contact with each other is not disrupted by mixing and dispersion processes.

There are limited literature reports of attempts to produce catalytically vapor grown carbon nanofibers on graphite or carbon substrates. However, the methods differ substantially from the method described in this invention and none report in situ production of VGCF on carbon fiber yarns, nonwoven, woven or braided preforms.

Hernadi et al. (1996) report on VGCF produced on graphite flakes using an iron catalyst and acetylene/nitrogen gas mixture. They treated the graphite flakes with iron acetate and then reduced under hydrogen at 1200° C. to produce metallic iron particles. VGCF were subsequently produced at 700° C. in a flowing acetylene/nitrogen gas at atmospheric pressure. The reported yield was extremely low at 3.4% with poor quality nanofibers. Yacaman et al. (1993) also reported VCGF produced on graphite flakes using an iron catalyst and acetylene/nitrogen gas mixture. They treated the graphite flakes with an iron oxalate solution and reduced the catalyst to metallic iron particles under hydrogen at 350° C. VGCF were subsequently produced at 700° C. in a flowing acetylene/nitrogen gas at atmospheric pressure for several hours. They reported nanofibers were produced with diameters in the range of 5.0 to 20 nanometers and length around 50 micrometers, however, after 1 hour of growth graphitic structure was noted around few catalytic particles. Ivanov et al. (1995) reported production of VGCF on graphite flakes using an iron catalyst and acetylene/nitrogen gas mixture. They treated the graphite flakes with an iron oxalate solution followed by calcination at 500° C. followed by reduction with hydrogen at 500° C. for 8 hours. Under optimal conditions they reported VGCF with average diameter of 40-100 nanometers and average length of 50 micrometers and 50% amorphous carbon. Wang et al. (2002) reported VGCF produced on graphite foil by sputter coating with stainless steel (Fe:Cr:Ni—70:19:11) followed by hydrogen reduction at 660C. VGCF were subsequently produced at 0.3 torr pressure using an acetylene/nitrogen mixture. Significantly, they reported that for a pure iron or nickel catalyst on graphite no VGCF were formed. Thostenson et al. (2002) used identical process conditions as Wang et al. (2002) for growth of VGCF on a carbon fiber. They reported a nanofiber growth layer region between 200-500 nm in thickness.

U.S. Pat. Nos. 5,165,909 and 6,235,674 (and related by the same inventors) discuss the possibility of producing carbon fibrils, fibril mats, furry fibers, furry plates, and branched fibrils by deposition of a metal-containing particle on the surface of a carbon or alumina fiber, plate, or fibril and subsequent chemical vapor catalytic growth of carbon fibrils on the substrate at temperatures in the range of 850° C. to 1200° C. This example requires deposition of a preformed catalyst particle onto a carbon substrate and furthermore no working examples were provided other than branched fibrils. These inventors did not discuss, or demonstrate, a working example of infusing continuous fiber preforms with VGCF. Their approach was limited because it required a separate process to form catalytic particles and disperse them. Such dispersion is not possible with a multifilament yarn of continuous macroscopic fiber or a woven or braided preform manufactured from a multi-filament yarn.

In all these cases no discussion or method exists for the production of VGCF on continuous carbon fiber yarns and preforms with sufficient yield in an industrially practical process. Thostenson et al. (2002) is the only literature report of VGCF growth on a carbon fiber, but in that case they used a stainless steel sputter coated fiber and specifically mentioned that catalyst could only be deposited on the outermost surfaces of a fiber bundle, not the interior fibers—and the process required a lengthy hydrogen reduction step to form catalytic particles, and furthermore, the growth was performed under high vacuum. None of these process steps are amenable to practical, scalable, manufacturing of nanofiber reinforced preforms.

In the detailed description of this invention the distinctions between these prior efforts will become clear as will the practical advantages of this invention.

SUMMARY OF THE INVENTION

In one aspect, the present invention provides a vapor grown carbon fiber reinforced composite preform demonstrating improved stiffness, strength, fracture toughness, and tailorable electrical and thermal properties in composite articles manufactured from same. In another aspect, the present invention provides a method for in situ manufacturing of a vapor grown carbon fiber reinforced composite preform useful in many industrial applications. In yet another aspect, the present invention provides a method for the manufacture of composite articles from these vapor grown carbon fiber reinforced composite preforms.

Other objects, features and advantages of the present invention will become apparent after review of the detailed description, figures and appended claims.

DETAILED DESCRIPTION OF THE INVENTION

I. In General

Figure 1A:
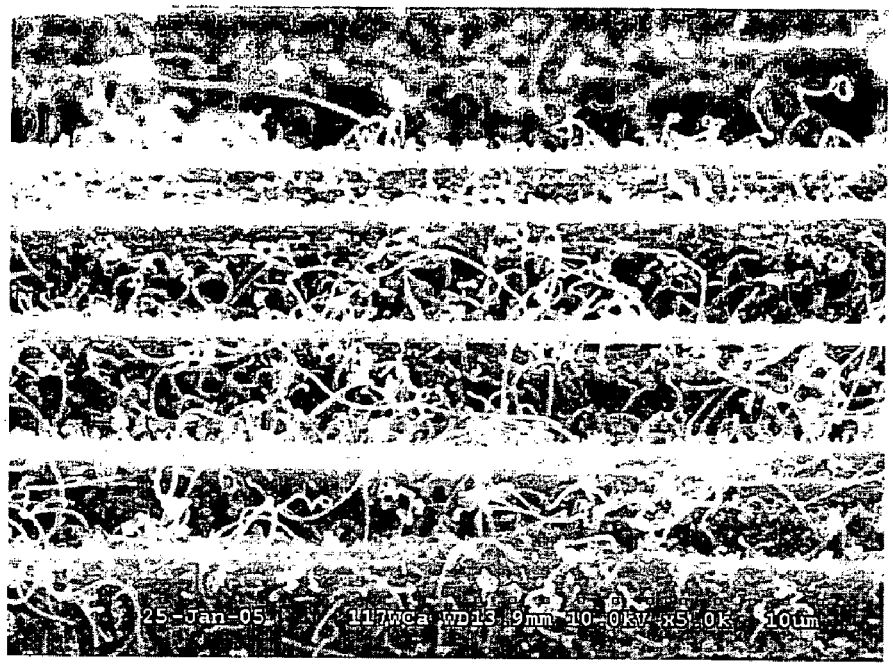
FIG. 1A. 5000×SEM image of carbon preform sample from Example 1.

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

The invention and the various features and advantageous details thereof are explained more fully with reference to the non-limiting embodiments that are illustrated in the accompanying drawings and detailed in the following description. Descriptions of well known components and processing techniques are omitted so as not to unnecessarily obscure the invention in detail but such descriptions are, nonetheless, included in disclosure by incorporation by reference of the citations following the Examples section. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

II. The Invention

In a first embodiment, the present invention is directed to a composite preform. The preform is understood to mean yarns of continuous fibers, non-woven broadgoods, woven textiles, braided textiles, or manufactured preforms from a combination of non-woven, woven and/or braided textiles of a continuous reinforcing fiber including, but not limited to, glass, ceramic, carbon, graphite, or metal. This invention provides for a continuous fiber preform infused with VGCF and the methods of producing the same.

The vapor grown carbon fibers are produced by contacting a hydrocarbon gas with a catalytic particle under appropriate reaction conditions and therefore this invention requires that the continuous fiber preform be subjected to a process that yields distributed catalytic particles within the preform. This can be accomplished by numerous methods. For example, the catalyst may be introduced into the preform by liquid or gas phase infusion of the preform with a suitable catalyst particle, or by infusion with a liquid or gas phase precursor solution that leads to the formation of the catalyst particle in situ. The continuous fiber yarn may also be treated so that the catalyst is dispersed on the yarn prior to manufacturing of a more complex perform. In these manners, the metal catalyst particle or metal catalyst particle yielding solution is distributed uniformly throughout the preform.

Iron, nickel, or cobalt catalytic particles and mixtures thereof are useful for dispersing on the continuous fiber preform to produce VGCF when contacted with an appropriate hydrocarbon gas under the appropriate conditions. Iron, nickel, cobalt, copper, chromium, or molybdenum compounds, and mixtures thereof are useful in the form of precursor solutions for treating preforms. Non-limiting examples include the acetates, nitrates, and oxalates of iron, nickel, and cobalt in solutions with water, alcohols, or mixtures thereof. Organo-metallic compounds with iron, nickel, or cobalt and mixtures thereof, such as ferrocene, will also be useful as catalyst precursor solutions. In general, the metal compound is dissolved in an appropriate solvent at the desired concentration, and then the preform is dipped, sprayed, or continuously passed through the solution followed by heating to remove the solvent. These non-limiting illustrations are methods of uniformly treating the preform with the catalyst precursor solution. Modifications to this process obvious to those skilled in the art are within the scope of this invention. For example, treatment of the preform with a sulfur bearing compound (e.g. thiophene) in addition to the catalyst may enhance the catalytic activity.

According to the invention, iron (III) nitrate nonahydrate (ferric nitrate) solutions in ethanol at a concentration ranging from 1 mM to 200 mM are effective as catalyst precursor treatments for continuous fiber preforms. More preferably, ethanol solutions of ferric nitrate with concentrations in the range of 25 mM to 125 mM have been shown to be very effective as a catalyst precursor treatment for carbon fiber preforms.

After treatment with the desired catalytic particle or catalyst precursor the preform is heated batchwise or in a continuous mode, to decompose the metal compound and yield the metal catalyst particle and oxidize the particle. This may be performed by heating at temperatures from 100° C. to 1000° C. in an oxidizing atmosphere. Preferably, this is performed in air at temperatures from 300° C. to 800° C. to yield an oxidized metal catalytic particle. Oxidation pretreatment has been discovered to give much higher VGCF yield on continuous carbon fiber preforms.

In another aspect of this embodiment, after treatment with the desired catalytic particle or catalyst precursor, the preform is subsequently treated in a flowing gas mixture to reduce the catalyst to a metallic particle. Preferably, this is done in a hydrogen/nitrogen or hydrogen/argon gas mixture using hydrogen from 1% to 100% of the gas mixture at a temperature from 100° C. to 1200° C. for a period of time from 1 minute to 100 hours. Most preferably the hydrogen is at 10% of the gas mixture, the temperature is in the range from 400° C. to 800° C. and the time is in the range of 1 hour to 12 hours.

The vapor grown carbon fibers are then produced on the continuous fiber preforms from the distributed catalyst particles by contacting a gas phase hydrocarbon or hydrocarbon gas mixture with the preform at a temperature from 500° C. to 1200° C. The vapor grown carbon fibers grow from the catalyst particles within the woven or braided composite preform resulting in a tangled mass of vapor grown carbon fibers infiltrated in the continuous fiber preform. The vapor grown carbon fibers fill void spaces between the continuous fibers in the preform and may exhibit partial orientation and alignment depending on the geometry and architecture of the perform. If the composite preform is constructed from graphite or carbon fibers the vapor grown carbon fibers may fuse to the fibers leading to further enhancement of properties. In particular embodiments, the hydrocarbon gas is modulated or pulsed during the VGCF growth process by turning the hydrocarbon gas flow on and off at periodic intervals while maintaining the flow of inert gas. The inventors have made the unexpected finding that this "pulsed" approach increases yield of VGCF on carbon fiber preforms.

In the case of carbon fiber continuous preforms, the inventors have discovered it to be particularly advantageous to initiate heating of the preform in an air atmosphere to oxidize the metal catalytic particle and carbon fiber surface to increase yield and improve the resulting morphology of the VGCF infused preform. Contrary to literature reports of VGCF growth on graphite substrates where the universal procedure is to purge the substrate with an inert gas prior to heating, the inventors have discovered the unexpected result that much higher yield of VGCF and higher aspect ratio is obtained if air is maintained initially in the reactor vessel in a manner to allow partial oxidation of the catalytic particle and substrate surface.

The hydrocarbon gas is methane, ethane, acetylene or mixtures thereof. More preferably, the hydrocarbon gas is acetylene and nitrogen or argon gas is mixed with the acetylene prior to introduction in the reactor vessel containing the composite preform, the growth temperature is between 700° C. and 850° C., the reaction time is between 15 minutes and 2 hours and the pressure is atmospheric. More preferably, the gas mixture is in the range of 1% to 20% acetylene and 99% to 80% nitrogen or argon, the temperature is between 750° C. and 850° C. and the reaction time is 30 to 120 minutes. Most preferably, the gas mixture is in the range of 1% to 10% acetylene and 99% to 90% nitrogen, the temperature is between 750° C. and 850° C. and the reaction time is 30 to 60 minutes.

The VGCF infused continuous fiber preforms may subsequently be subjected to processing operations know to artisans such as heat treatment, solvent wash, and other treatments designed to remove the metal catalyst from the preform and change the chemical composition and physical characteristics of the vapor grown carbon fiber surface. Such surface treatment may be desirable to increase adhesion to a polymer or other matrix material in composite materials manufactured from these performs, or to make the VGCF infused preform more suitable for an application as an electrode, filter media, remediation media, gas storage media, or support for catalysis or cell growth.

As previously mentioned, after the VGCF are grown in the preform it may be desirable to treat the preform with an aqueous solution of an inorganic acid, such as a mineral acid, to remove excess catalyst particles, if present, and to improve the bonding characteristics of the VGCF infused preform. Non-limiting examples of suitable mineral acids include sulfuric acid, nitric acid, and hydrochloric acid. Preferred is nitric or sulfuric acid, or a sulfuric acid treatment followed by a nitric acid treatment.

In a preferred embodiment the continuous fiber preform is produced from either continuous polyacrylonitrile (PAN) or pitch carbon fibers (e.g. commercially sold as IM7, AS4, T300, T700, PANEX 33 (federally registered trademark), IMx, YS-90A, CARBOFLEX (federally registered trademark)) and vapor grown carbon fibers produced in situ in the continuous carbon fiber preform.

In a preferred embodiment the woven or braided preform is produced from a non-carbon fiber continuous fiber such as E-glass, S-glass, quartz, or ceramic and vapor grown carbon fibers produced in situ in the continuous fiber preform. In this case, the vapor grown carbon fibers can impart desirable electrical and thermal characteristics to composites manufactured from these preforms. These fibers are in general non-conductors. Infusion of the continuous fiber preform with VGCF as described in this invention imparts electrical conductivity at extremely low levels of VGCF.

Composite articles can be manufactured from these vapor grown carbon fiber reinforced composite performs by infusing the preform with a suitable matrix materials. In a preferred embodiment, the resulting vapor grown carbon fiber reinforced woven or braided preforms are subsequently infused by a thermoplastic polymer in the molten state, a suitable low viscosity thermoset polymer resin, a polymer resin solution, powdered polymer particle dispersion, or any other means know by artisans to infuse a polymer into a continuous reinforcing fiber preform. Furthermore, the manufacture of composites from the vapor grown carbon fiber reinforced preforms is not limited to polymer matrices.

Composites produced from these vapor grown carbon fiber reinforced preforms can also exhibit useful properties when infused by metals, ceramics and ceramic precursors, pitches and other carbon precursors, chemical vapor deposition (CVD), plasma enhanced deposition or polymerization, and other means.

In a most preferred embodiment, the woven or braided preform is produced from either continuous PAN or pitch carbon fibers (e.g. commercially sold as IM7, AS4, T300, T700, PANEX 33 (federally registered trademark), IMx, YS-90A, CARBOFLEX(federally registered trademark), and other equivalent materials) and vapor grown carbon fibers produced in situ in the continuous carbon fiber preform, and the resulting vapor grown carbon fiber reinforced continuous fiber preform is infused with a suitable low viscosity thermoset polymer resin and thermally processed into a finished composite article with useful properties.

EXAMPLES

This invention is illustrated in the examples which follow. The examples are set forth to aid in an understanding of the invention but are not intended to, and should not be construed to; limit in any way the invention as set forth in the claims which follow thereafter.

Example 1

Carbon Fiber Textile Infusion with VGCF

Figure 1B:
FIG. 1B. 30,000×SEM image of carbon preform sample from Example 1.

A piece of plain weave polyacrylonitrile (PAN) carbon fiber cloth was desized by solvent wash with toluene and acetone followed by oven drying. The sample was then immersed in a 125 mM solution of ferric nitrate in ethanol, and dried at 80° C. and placed in a 50 mm tube furnace. The tube furnace was immediately heated to 800° C. and nitrogen flow of 90 sccm was started when the tube furnace temperature reached 100° C. After 15 minutes at 800° C. 5 sccm of acetylene was started and the nitrogen flow was reduced to 75 sccm. After 60 minutes the acetylene was turned off and the oven was cooled to 200° C. under nitrogen flow of 75 sccm. SEM images of the resulting VGCF infused preform are shown in FIGS. 1A and 1B. In FIG. 1A, the continuous carbon fibers of the preform are clearly visible with the mass of entangled VGCF infused into the preform. In FIG. 1B at higher magnification, the morphology of the well-formed VGCF are shown fused to the continuous carbon fiber surface.

Example 2

Carbon Fiber Textile Infusion with VGCF

Figure 2:
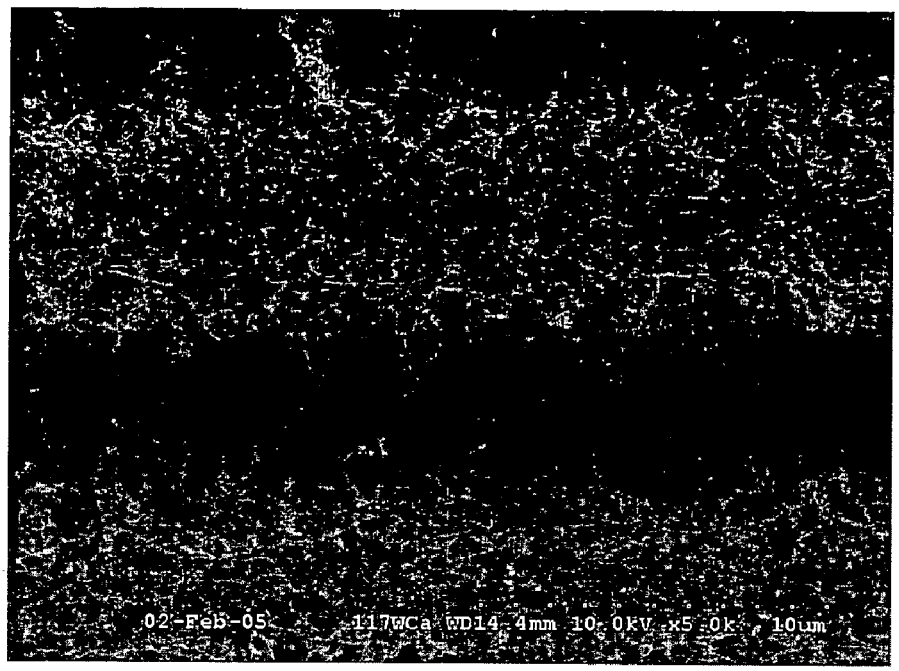
FIG. 2. 5000×SEM image of carbon preform sample from Example 2.

A piece of plain weave PAN carbon fiber cloth was desized by solvent wash with toluene and acetone followed by oven drying. The sample was then immersed in a 100 mM solution of ferric nitrate in ethanol, and dried at 80° C. The sample was then heated at 300° C. for 30 hours in an air convection oven, cooled, and placed in a 50 mm tube furnace. The tube furnace was heated to 750° C. and when it reached 600° C. nitrogen flow of 90 sccm was started. After 15 minutes at 750° C. 5 sccm of acetylene was started and the nitrogen flow was increased to 250 sccm. After 60 minutes the acetylene was turned off and the oven was cooled to 200° C. under nitrogen flow of 90 sccm. An SEM image of the resulting VGCF infused preform is shown in FIG. 2. In FIG. 2, the continuous carbon fibers of the preform are clearly visible with the mass of entangled VGCF infused into the preform.

Example 3

Carbon Fiber Textile Infusion with VGCF

Figure 3:
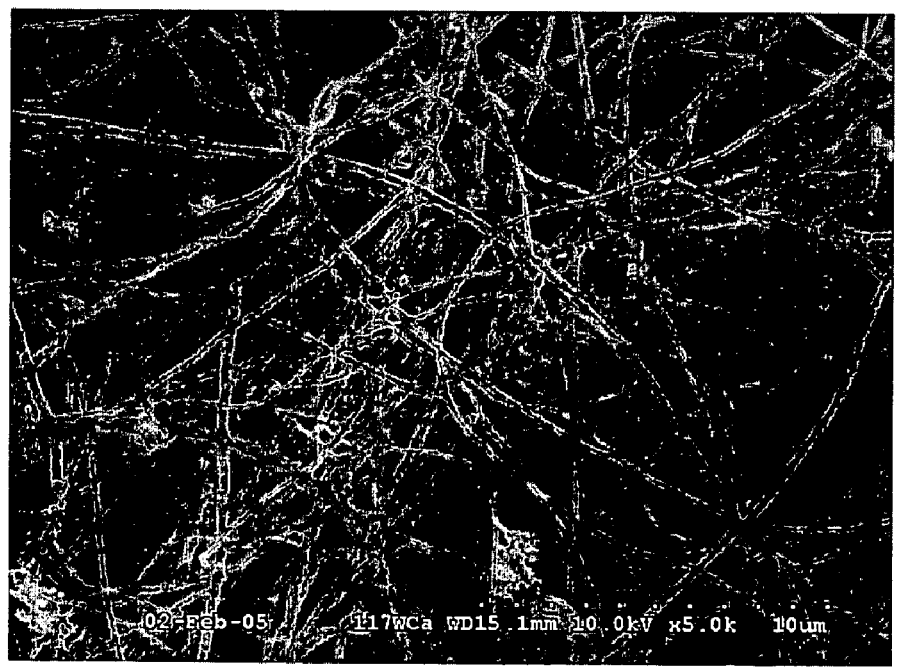
FIG. 3. 5000×SEM image of carbon preform sample from Example 3

A piece of plain weave PAN carbon fiber cloth was desized by solvent wash with toluene and acetone followed by oven drying. The sample was then immersed in a freshly prepared 100 mM solution of ferric nitrate in ethanol, and dried at 80° C. The sample was then heated at 300° C. for 30 hours in an air convection oven, cooled, and placed in a 50 mm tube furnace. The tube furnace was heated to 750° C. and when it reached 600° C. nitrogen flow of 90 sccm was started. After 15 minutes at 750° C. 5 sccm of acetylene was started and the nitrogen flow was increased to 250 sccm. After 60 minutes the acetylene was turned off and the oven was cooled to 200° C. under nitrogen flow of 90 sccm. An SEM image of the resulting VGCF infused preform is shown in FIG. 3. In FIG. 3, the continuous carbon fibers of the preform are obscured by the high yield dense growth mass of entangled VGCF infused into the preform.

Example 4

Carbon Fiber Textile Infusion with VGCF

Figure 4:
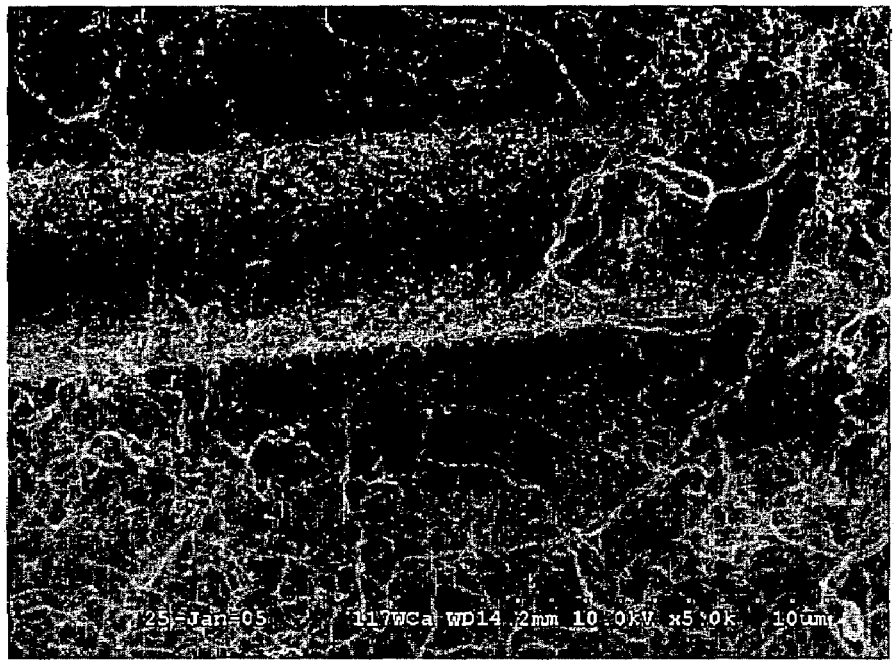
FIG. 4. 5000×SEM image of carbon preform sample from Example 4.

A piece of plain weave PAN carbon fiber cloth was desized by solvent wash with toluene and acetone followed by oven drying. The sample was then immersed in a freshly prepared 25 mM solution of ferric, nitrate in ethanol, and dried at 80° C. then placed in a 50 mm tube furnace. The tube furnace was heated to 750° C. and when it reached 100° C. nitrogen flow of 90 sccm was started. After 15 minutes at 750° C. 5 sccm of acetylene was started and the nitrogen flow was reduced to 75 sccm. After 30 minutes the acetylene was turned off and the oven was cooled to 200° C. under nitrogen flow of 90 sccm. An SEM image of the resulting VGCF infused preform is shown in FIG. 4. In FIG. 4, the continuous carbon fibers of the preform are visible along with the high yield dense growth mass of entangled VGCF infused into the preform.

Example 5

Carbon Fiber Textile Infusion with VGCF Using a Reduced Catalyst

Figure 5:
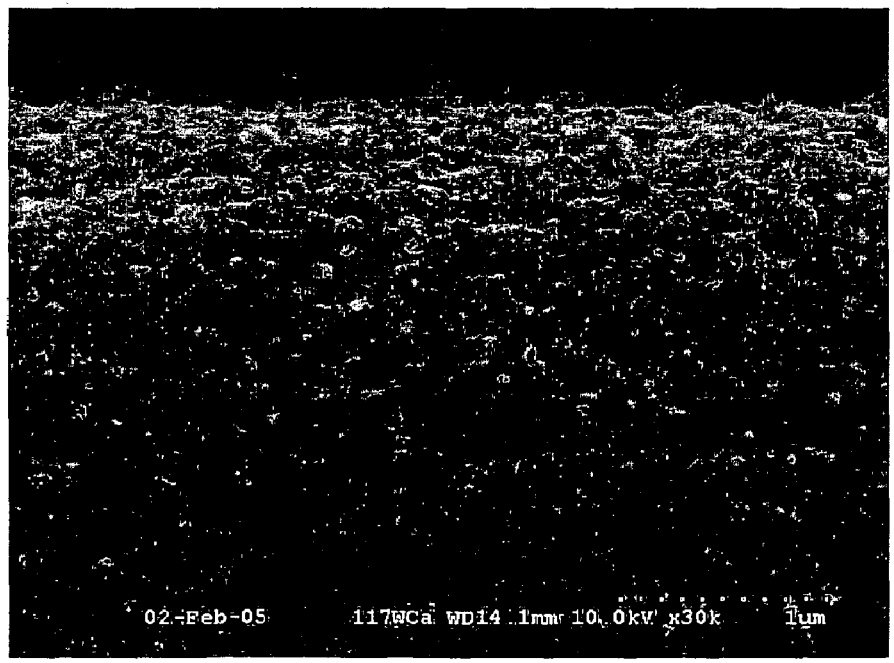
FIG. 5. 30,000×SEM image of carbon preform sample from Example 5.

A piece of plain weave PAN carbon fiber cloth was desized by solvent wash with toluene and acetone followed by oven drying. The sample was then immersed in a freshly prepared 75 mM solution of ferric nitrate in ethanol, and dried at 80° C. The sample was subsequently was heated in air at 300° C. to decompose and oxidize the iron catalyst. The sample was then placed in a 50 mm tube furnace and heated to 500° C. under a nitrogen flow of 250 sccm. At 500° C. the nitrogen flow was reduced to 150 sccm and 15 sccm of hydrogen was introduced. These conditions were held for four hours to reduce the catalytic particles to metallic iron. The hydrogen flow was then stopped and the nitrogen increased to 250 sccm and the tube furnace cooled to 50° C. Under a flow of 250 sccm of nitrogen the tube furnace was heated to 700° C. When it reached 700° C. the nitrogen flow was reduced to 90 sccm. After 15 minutes at 700° C. 5 sccm of acetylene was started and the nitrogen flow was reduced to 75 sccm. After 60 minutes the acetylene was turned off and the oven was cooled to 200° C. under nitrogen flow of 90 sccm. An SEM image of the resulting VGCF infused preform is shown in FIG. 5. In FIG. 5, the continuous carbon fibers of the preform are visible along with the dense growth of low aspect ratio VGCF infused into the preform.

Example 6

Conductive Composite Fabricated from Quartz Fabric Infused with VGCF

A piece of high temperature resistant fabric woven with quartz glass yarns (available from JPS Converter and Industrial Fabric, Corp., under federally-registered trademark ASTROQUARTZ II, style 525) was solution coated with a 75 mM ferric nitrate solution in ethanol and dried for 1 hour at 80° C. The sample was then weighed, placed in a 50 mm tube furnace, nitrogen flow was started at 75 sccm, and heated to 750° C. After 15 minutes at 750° C. acetylene flow of 15 sccm was started to initiate VGCF growth. After 1 hour the acetylene flow was stopped and the tube furnace was cooled to room temperature. The resulting fabric sample had a uniform metallic, shining dark gray appearance and was found to have increased in mass by 0.15%. The sample was then cut into strips 12 cm wide and 60 cm long aligned in the warp direction and a composite fabricated by coating 6 of these strips with an epoxy resin (EPON 862/Cure Agent W) and compression molding in a heated press for 4 hours at 250° F. and 2 hours at 350° F. The sample was then removed from the mold and the resistance measured at several points in both the warp and fill directions. The average resistivity between probes 1 cm apart in the warp direction was found to be 0.130 ohm·meter and the average resistivity between probes 1 cm apart in the weft (fill) direction was found to be 0.135 ohm·meter. This data indicates that the conductivity of the composite material was increased by approximately a factor of $10^{10}$ to $10^{14}$ at a composite mass fraction of about 0.1% VGCF.

Upon reviewing the present disclosure, those skilled in the art will recognize, or be able to ascertain using no more then routine experimentation, numerous equivalents to the specific materials and methods described herein. Such equivalents are considered to be within the scope of this invention and encompassed by the following claims.

REFERENCES

Hemadi, et al., "Fe Catalyzed Carbon Nanotube Formation," Carbon, 34(10), 1249, 1996.
Yacaman, M. J. et al., "Catalytic Growth of Carbon Microtubules with Fullerene Structure," Applied Physics Letters, 62, 657, 1993.
Ivanov, et al., "Catalytic Production and Purification of Nano-tubules Having Fullerene Scale Diameters," Carbon, 33(12), 1727, 1995.
Wang, et al., "Controlled Growth of Carbon Nanotubes On Graphite Foil by Chemical Vapor Deposition," Chem. Phys. Letters, 335, 141, 2002.
Thostenson, E. T., et al., "Carbon Nanotube/Carbon Fiber Hybrid Multi-Scale Composites," Journal of Applied Physics, 91(9), 6034, 2002.
Tibbetts, et al., "Apparatus for Forming Carbon Fibers," U.S. Pat. No. 5,024,818, Jun. 18, 1991.
Alig, et al., "Method for Forming Carbon Fibers," U.S. Pat. No. 5,374,415, Dec. 20, 1994.
Tennent, et al., "Carbon Fibrils and Method for Producing Same," U.S. Pat. No. 5,165,909, Nov. 24, 1992.
Tennent, et al., "Carbon Fibrils, Methods for Producing Same and Adhesive Compositions Containing Same," U.S. Pat. No. 6,235,674, May 22, 2001.

What is claimed is:

1. A process for producing a carbon reinforced preform of continuous fiber useful in the manufacture of carbon reinforced composite articles, comprising steps of:
   (a) dispersing a catalyst precursor throughout a preform of continuous fiber;
   (b) converting said catalyst precursor into catalytic particles, said catalytic particles dispersed throughout the preform; and
   (c) contacting the preform of continuous fiber containing the catalytic particles with a hydrocarbon gas whereby vapor grown carbon nanofibers are deposited in situ at the catalytic particles throughout the preform to yield a carbon reinforced preform of continuous fiber.

2. The process according to claim 1 wherein said catalyst precursor comprises iron, nickel, cobalt, copper, chromium, molybdenum, or a mixture thereof.

3. The process according to claim 2 wherein said catalyst precursor is an alcohol or alcohol/water solution of iron acetate, iron nitrate, iron oxalate, nickel acetate, nickel nitrate, nickel oxalate, cobalt acetate, cobalt nitrate, cobalt oxalate, or a mixture thereof.

4. The process according to claim 1 wherein said catalyst precursor is a solution of iron (III) nitrate nonahydrate (ferric nitrate) in ethanol.

5. The process according to claim 1 wherein said catalyst precursor is provided in an alcohol or alcohol/water solution and, following dispersion of the catalyst precursor throughout the preform of continuous fiber, alcohol or alcohol/water solvent is removed from the process by drying.

6. The process according to claim 1 wherein step (b) is carried out under oxidizing conditions.

7. The process according to claim 6 wherein step (b) is carried out by heating the precursor catalyst in air at 300° C. to 500° C. for 1-24 hours at atmospheric pressure.

8. The process according to claim 1 wherein step (b) is carried out under reducing conditions.

9. The process according to claim 8 wherein step (b) is carried out by heating the precursor catalyst in the presence of a hydrogen or hydrogen/inert gas mixture to 400° C. to 800° C. for 1-12 hours at atmospheric pressure.

10. The process according to claim 1 wherein the hydrocarbon gas is methane, ethane, acetylene or a mixture thereof.

11. The process according to claim 10 wherein step (c) is carried out at a temperature between 700° C. and 850° C. for 15 minutes to 2 hours at atmospheric pressure.

12. The process according to claim 10 wherein step (c) of contacting the preform of continuous fiber containing the catalytic particles with a hydrocarbon gas is carried out by pulsing said hydrocarbon gas though the preform of continuous fiber at periodic intervals.

13. The process according to claim 1 wherein the hydrocarbon gas is conveyed to the preform of continuous fiber in a stream of inert gas.

14. The process according to claim 1 wherein the preform of continuous fiber comprises carbon, graphite, glass, ceramic, or metal.

15. A process for providing a carbon reinforced composite article comprising steps of:
   (a) dispersing a catalyst precursor throughout a preform of continuous fiber;
   (b) converting said catalyst precursor into catalytic particles, said catalytic particles dispersed throughout the preform of continuous fiber;
   (c) contacting the preform of continuous fiber containing the catalytic particles with a hydrocarbon gas to yield a carbon nanofiber reinforced preform of continuous fiber; and
   (d) infusing said carbon reinforced preform of continuous fiber with a thermoplastic or thermoset polymer, thermoplastic or thermoset polymer resin, metal, ceramic, ceramic precursor, or amorphous glass to provide a carbon reinforced composite article.

* * * * *